Jan. 1, 1929.                                           1,697,085
C. N. POGUE
EMERGENCY SAFETY ATTACHMENT FOR MOTOR VEHICLES
Filed May 7, 1928          3 Sheets-Sheet 1

Inventor
Charles N. Pogue.
BY
Attys

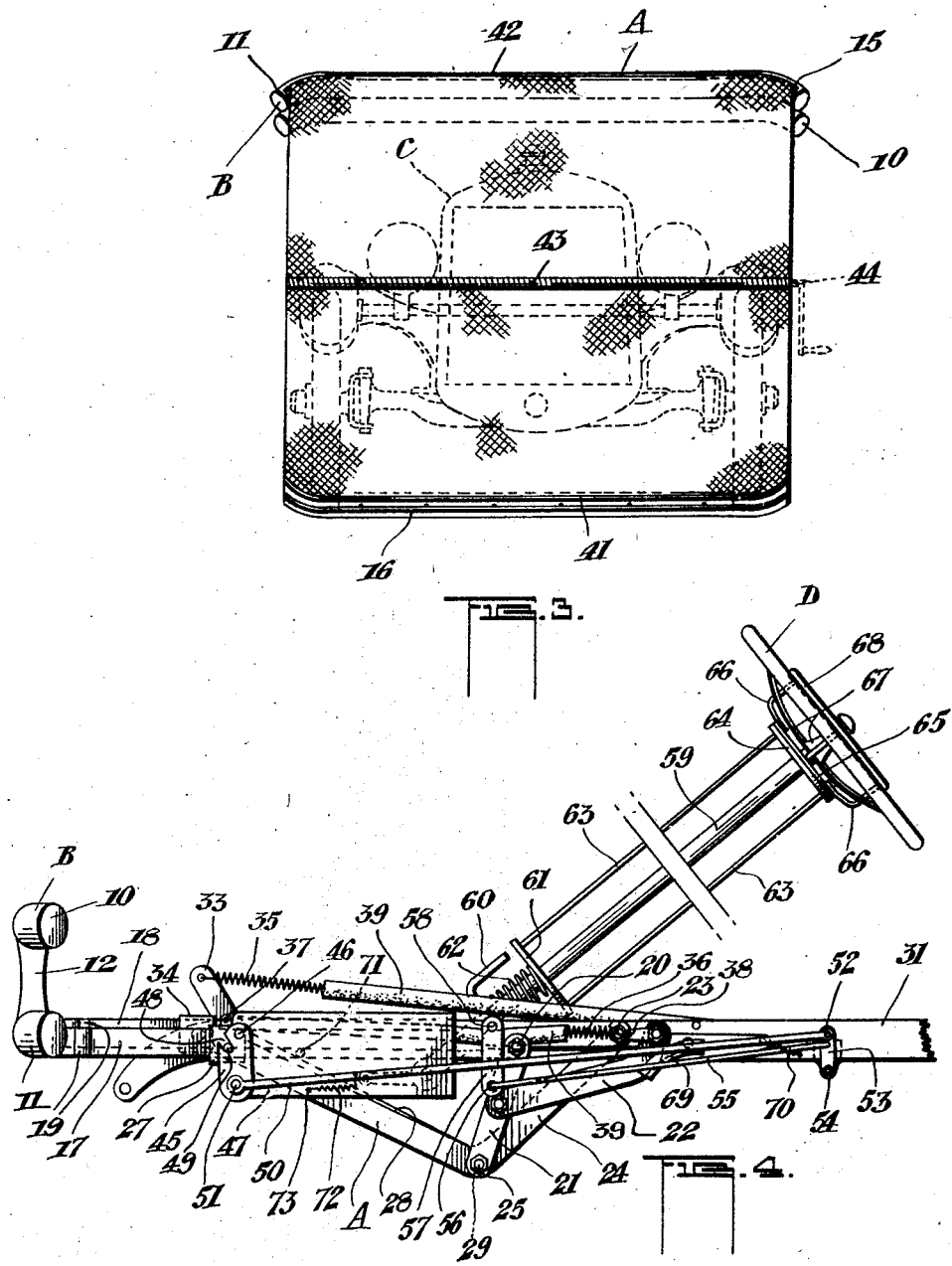

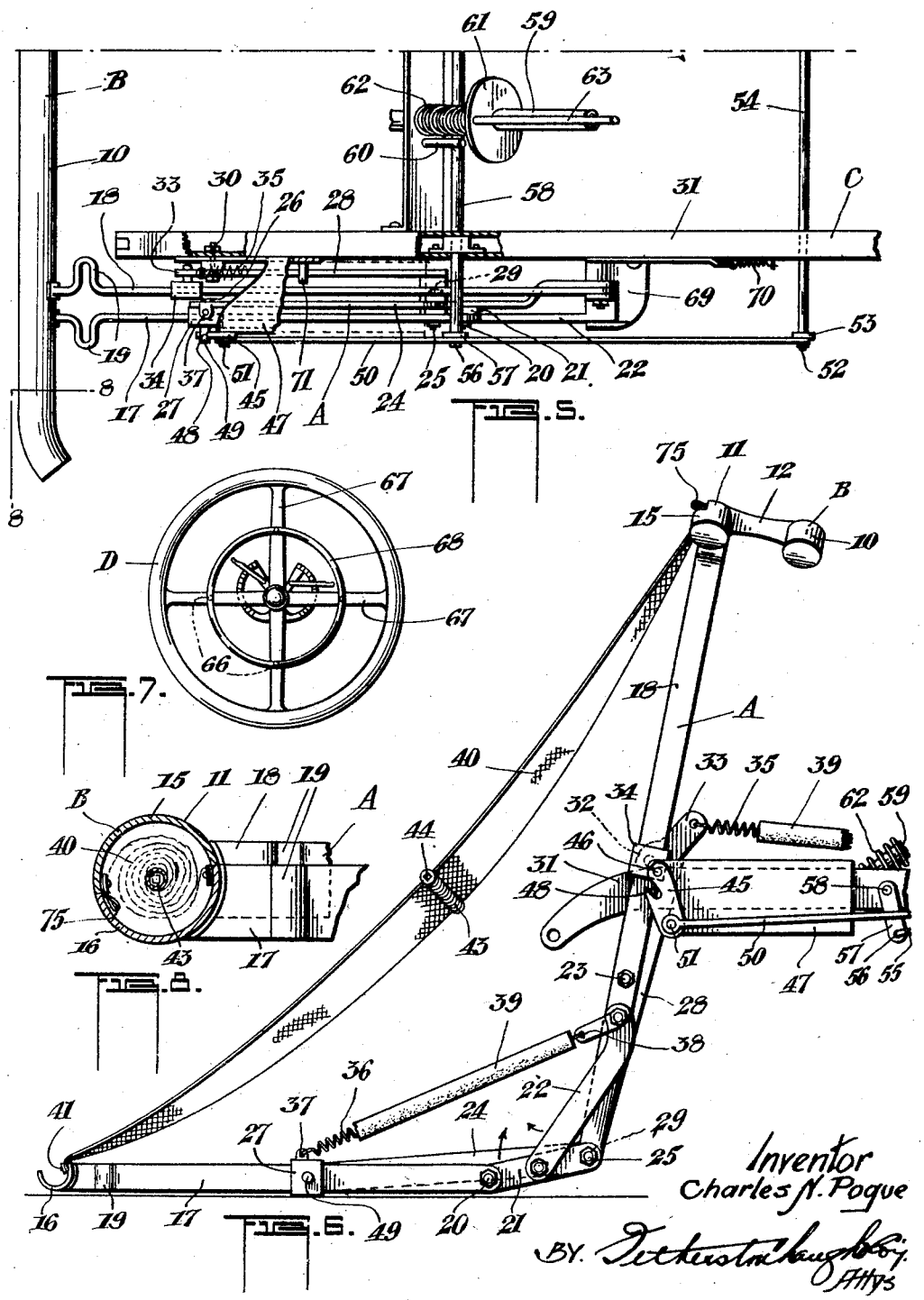

Patented Jan. 1, 1929.

1,697,085

UNITED STATES PATENT OFFICE.

CHARLES NELSON POGUE, OF ST. VITAL, WINNIPEG, MANITOBA, CANADA.

EMERGENCY SAFETY ATTACHMENT FOR MOTOR VEHICLES.

Application filed May 7, 1928. Serial No. 275,895.

This invention relates to improvements in emergency safety devices for motor vehicles and particularly to that type of device which guards pedestrians from serious injury through the operation of the motor vehicle.

One of the outstanding features of the invention is the combined mechanism which includes the safety device with the bumper. This is accomplished in such a manner that the bumper is employed for its designated purpose, i. e. to protect the motor vehicle, while the safety device is to protect pedestrians from injury should they be about to be run into by a motor vehicle.

A further object of the invention is to provide a device of this character of a twofold nature which may be operable from the steering wheel by the driver of the motor vehicle and in which the operative means is so positioned on the steering wheel that no difficulty is encountered in operating it, such as is the case in devices where the trip operating levers are positioned in remote parts of the vehicle.

A still further object of the invention is to provide a safety device which will immediately respond when the trip mechanism is operated and which is adapted to operate during a minimum distance of travel of the vehicle so that the moving vehicle may be almost on top of a pedestrian so to speak when the safety device is released and still protect a pedestrian from injury by being struck with the motor vehicle.

Yet a further object is to provide an emergency safety attachment for motor vehicles with collapsible extension arms in combination with a bumper, which when folded form a neat appearing and practical device for the protection of motor vehicles.

With the foregoing and other objects in view, the invention consists essentially of a bumper member formed in two sections and connected by means of collapsible extension arms, both of which are through indirect means pivotally connected with the chassis of the motor vehicle. These sections have connected thereto a net or canvas which when the device is in operative position is adapted to extend substantially in the form of a basket holding an angle of approximately 45°.

In the accompanying drawings in which the several views of my improved device are illustrated, Figure 1 is a side view of the front portion of a motor vehicle with my improved emergency safety device attached thereto in collapsed position and being used as an ordinary bumper.

Figure 3 is a front view showing the emergency safety device in open position.

Figure 4 is an enlarged side view of the improved device with the obstructing part of the motor car eliminated so as to set forth clearly the combined elements, the device being in folded or collapsed position.

Figure 5 is a plan view of Fig. 4, partly in section.

Figure 6 is a side view of the device in open or emergency position.

Figure 7 is a plan view of an ordinary steering wheel with my improved trip release mounted thereon.

Figure 8 is a section on the line 8—8 of Fig. 5.

Reference characters in the several views indicate corresponding parts in the several views and A indicates the emergency safety device as a whole, B the bumper, C the motor vehicle to which the device is attached and D the steering wheel.

Figure 1:
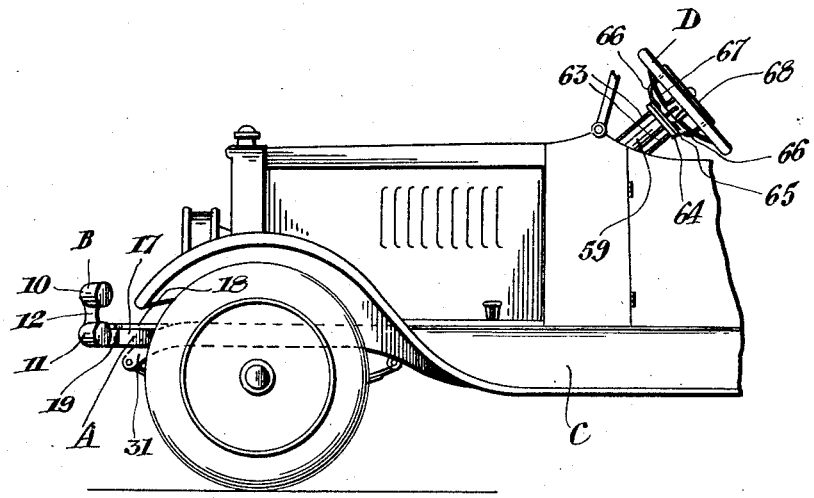

One of the novel features of my invention is the utilization of the bumper in its generally protecting sense, as well as an emergency safety device to prevent pedestrians from being run down and injured. The bumper in this case therefore performs a two-fold object and comprises tubular members 10 and 11 which are connected by means of legs 12. The lower tubular member which is designated by the numeral 11 is formed in two sections 15 and 16 (see Figs. 3 and 8). Each section comprises substantially one half the tubular portion of the member 11. It will be seen by referring to Fig. 3 that the section 16 extends substantially the length of the member 11, the object of which may be later referred to.

For purposes of operation of the device, I provide supporting means for the bumper. This comprises a pair of arms 17 which are rigidly secured to the member 11, the portion of the arms adjacent the bumper having U-shaped formations 19 designed to absorb a shock when utilizing as a bumper.

The extremities of the arms 17 have pivotally connected thereto at 20 link members 21, while the extremities of the arms 18 are pivotally connected to the link 21 by means of the links 22. Adjacent the extremities of the arms 18 as indicated at 23 are the substantially L shaped arms 24. The bends of the L shaped arms are pivotally connected as at 25 to the links 21, while the opposite ends are pivotally connected at 26 to the sliding sleeves 27 which are slidably operable on the arms 17.

The supporting means for the device as a whole comprise the arms 28. These arms are pivotally connected, as indicated at 29, to the links 21 and pivotally mounted as indicated at 30 on the chassis 31. Two extensions 32 and 33 are provided for the arms 28, the former being pivotally connected to the sleeves 34 which are slidably operable on the arms 18, while the latter is engaged by the coil springs 35. These springs are at a predetermined tension and are connected to the chassis 31 in any convenient manner.

In addition to the coil springs 35 for effecting movement of the front extension arms 17 and 18, I provide coil springs 36 which are adapted to regulate and accelerate the movement of the arms, in operation. For this purpose I have shown springs connected to the slide carrying arms as at 37 and to the pivotal point at 38. Suitable covering, as indicated at 39, may be conveniently provided for the protection of the springs 35 and 36.

The emergency net which is indicated by the numeral 40 and which forms an important element of my invention, may be of any stout, flexible material, such as canvas or heavy netting. One end of the material is firmly secured to the member 16 as indicated at 41, while the opposite end is secured to the member 11 at 42. Intermediate of its length the member 40 is preferably provided with a flexible member, such for instance as a weak coil spring 43. One end of this terminates with a square or hexagonal extension 44 by which means the net may be wound for replacement in the tubular bumper. It should be noted that the particular means of rolling the canvas is preferable to folding, as it not only makes the roll more compact, but evenly divides the length during the unrolling operation.

Figure 2:
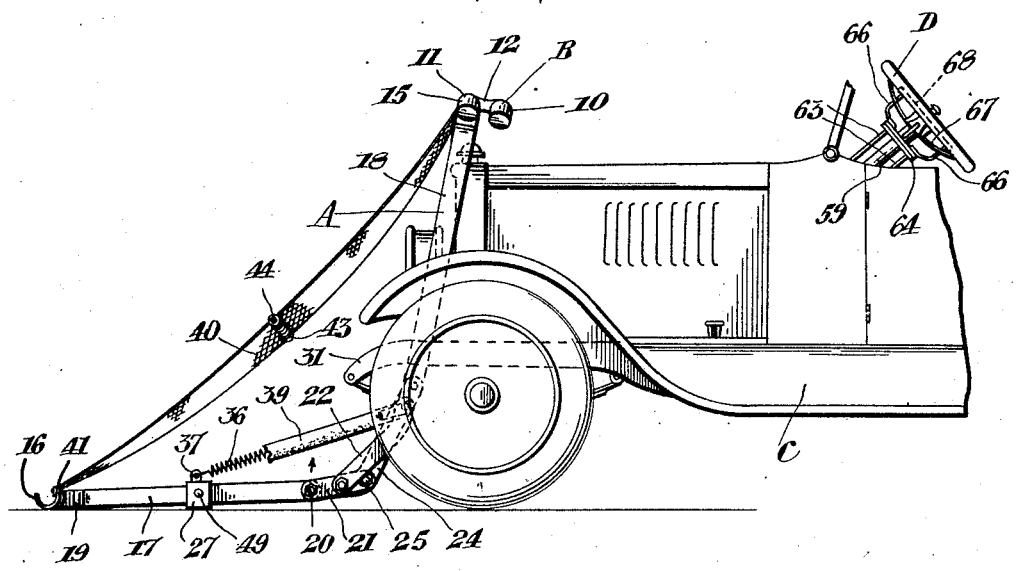
Figure 2 is a view similar to Fig. 1, except that the safety device has been released and is in open position.

From the foregoing and by referring to Figs. 1 and 2, it will be observed that while the emergency device is inoperative it is neat in appearance and may be used in a practical way as a bumper and while in open position after the formation of the net or basket upon which a pedestrian would fall in case of accident.

Certain retaining and releasing means are provided for the successful operation of the device. The retaining means (see Figs. 4 and 6) comprises link members 45 pivotally connected at 46 to the protective covers 47 which are adapted to protect the folded arms from the elements. These links are provided with slots 48 which when the arms 17 and 18 are collapsed are adapted to be engaged by the heads 49. The connecting means adapted to operate the links 45 comprises the rods 50 pivotally connected as at 51 to the links 45 and extending rearwardly to connect as at 52 with the lever arms 53 (see Figs. 4 and 5), the levers 53 being supported by the transversely extending shaft 54 which extends transversely of the chassis.

The operating rods 55 are also connected to the lever arms 53 and extend forward thereof to connect as at 56 with the levers 57. These levers are connected to the shaft 58 which extends transversely of the chassis 31.

Adjacent the steering column 59, the shaft 58 is provided with a trip finger 60 which is operable by means of the disc 61 mounted on the column 59. The disc 61 is retained in an inoperative position by means of the coil spring 62 and is provided with supporting rods 63 which extend upwardly toward the steering wheel D and immediately below which are connected to the disc 64.

Contacting with the disc 64 and independently movable thereof is a disc 65. This disc is slidably movable on the column 59 and is provided with arms 66 which extend through the spider arms 67 of the steering wheel D to connect with the operating ring 68. From the foregoing it will be seen that the steering wheel may be operated without interference with the disc 64, at the same time the ring 68 which operates the trip may be operated irrespective of the position of the steering wheel.

To assist in retaining the arms 17 and 18 in collapsed position and prevent noise by rattle, etc. I provide on each side of the chassis pivotally mounted brackets 69. These brackets are tensioned in position by means of the spring 70 and are adapted as indicated in Fig. 5 to support the folded ends of the arms, while the stop pins 71 prevent their upward movement.

While the links 45 will in themselves retain the emergency safety device in collapsed position, I provide auxiliary means to ensure that the locked position is maintained. The means which I have shown comprise the springs 72 connected as at 73 to the members 47 and the rods 50.

In operation and assuming that the vehicle is moving along a thoroughfare, at an average speed, the safety device is collapsed as indicated in Fig. 1. Suddenly the driver of the vehicle observes the pedestrian immediately in front of the vehicle. His first movement would be the depression of the member 68; the depression of this member will cause the arms 63 to move the disc 61 into engagement with the finger 60; the finger 60 moving downwardly will cause the levers 57 to move the rods 55 rearwardly. This in turn will move the lever 53 therewith.

The rearward movement of the levers 53 will move therewith the rods 50 and the links 45 causing the links to release the pins 49 from engagement therewith and permit the springs 35 to exert pressure on the arms 28. The pressure thus exerted forces the arms 28 downward moving with them the L shaped arms 24. As this movement progresses the arms 18 slide through the sliding sleeves 34, while the arms 17 slide through the sleeves 27. As the movement continues still further the links 21 move from a substantially vertical position to a horizontal position (see Figs. 4 and 6), while the links 22, at the same time move from a substantially horizontal position to a substantially vertical position.

The result of this movement extends both pairs of arms 17 and 18 beyond their ordinary collapsed length, the result being that when the emergency attachment is in open position the spread of the net between the members 16 and 11 covers the entire front of the vehicle and is adequate to take care of most any emergency. Should by any chance a pedestrian be struck in such a manner that his head or other part of his person come in contact with the upper portion of the bumper when it is in open position, I provide the member 11 with a resilient protective material, such as rubber or the like which is indicated at 75.

In order that the emergency safety device be collapsed and returned to its normal position after operation, the members 11 and 16 are pressed together in any convenient manner. During the pressing together of these members, any suitable means may be employed to roll the flexible member 43 so that when the members are closed the roll will assume substantially the same position as indicated in Fig. 8. When the extremity of the closing is reached the slots 48 in the links 45 will be engaged by the pins 49 locking the device in closed position, at the same time the arms 17 and 18 will rest on the channeled bracket members 69.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. An emergency safety attachment for motor vehicles adapted to guard pedestrians against serious injury, comprising in combination with a motor vehicle of a sectionally formed bumper, a flexible net carried by the sections and housed thereon, independent supporting arms for the sections, link members collapsibly connecting the arms to the motor vehicle, locking means adapted to retain the safety device inoperative and lock releasing means associated with the steering wheel adapted to release the lock.

2. An emergency safety attachment for motor vehicles comprising in combination a sectionally formed tubular bumper, a flexible net fixedly connected to the sections and adapted to be housed therebetween, resilient supporting arms for the sections, link members pivotally connecting the arms to each other and to the motor vehicle, locking means adapted to lock the arms in collapsed position and the bumper against displacement, and lock releasing means adapted to release the bumper sections.

3. An emergency safety device as set forth in claim 2 in which coil springs are connected to the link members whereby on the release of the supporting arms pressure is exerted thereon causing said arms to spread.

4. An emergency device as set forth in claim 1 in which the emergency release operating means is operable independent of the steering wheel.

5. An emergency safety device as set forth in claim 1 in which spring tension means in combination with the steering mechanism is adapted to retain the release operative mechanism inoperative.

6. An emergency safety device as set forth in claim 1 in which the sectional arms are pivotally connected to the link members by means of slidable sleeves mounted on the sectional arms.

7. An emergency safety attachment for motor vehicles comprising in combination, a sectionally formed bumper, supporting arms for the bumper extendibly connected thereto, a series of link members connected to the motor vehicle, lock means adapted to retain the sections in collapsed position, lock releasing means adapted to release the sections from locked position and spring tensioning means adapted to cause the arms to spread upon the operation of the lock release.

8. An emergency safety attachment for motor vehicles comprising a sectionally formed bumper, extensible arms supporting the sections of the bumper, link members pivotally and slidably connecting the arms to each other and to the motor vehicle, substantially foldable means associated with the link members whereby on release from collapsed position the arms move in opposite directions with a spreading movement, while the link connecting members cause the arms to extend.

9. An emergency safety device of the expandible and collapsible type in combination with a motor vehicle, of sectionally formed bumper, collapsible supporting arms for the sections pivotally connected to each other and to the motor vehicle, a net member fixedly connected to each section of the bumper adapted upon the expanding of the sections to open in extended form, a flexible member fixedly secured to the net substantially midway thereof and provided with an extension by which means the net may be rolled for replacement upon the collapsing of the sections.

In witness whereof I have hereunto set my hand.

CHARLES NELSON POGUE.